Feb. 2, 1965 G. C. WOOD 3,167,900
ROTARY SIDE DELIVERY RAKES
Original Filed Oct. 5, 1960 3 Sheets-Sheet 1
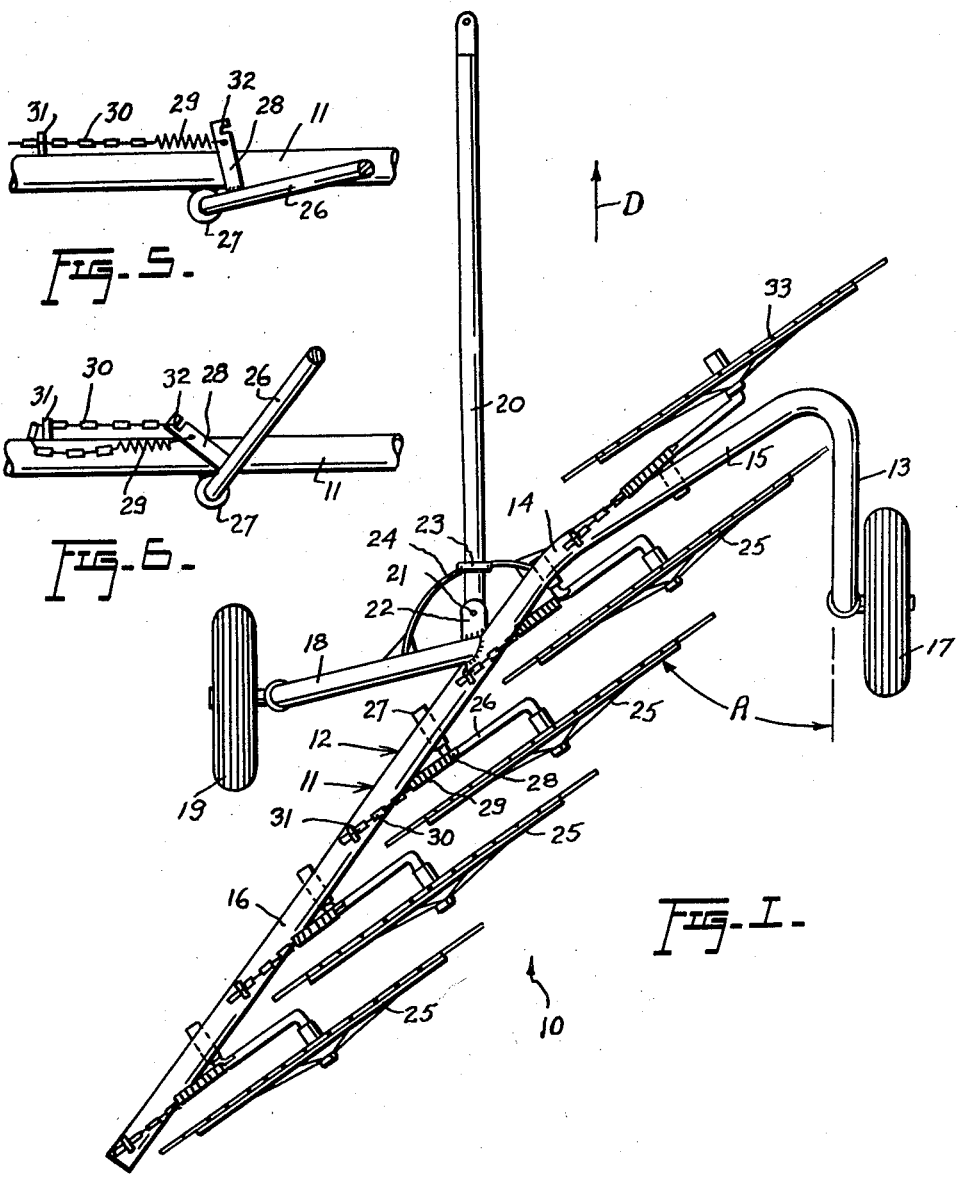
INVENTOR
George C. Wood
BY Munson H. Lane
ATTORNEY

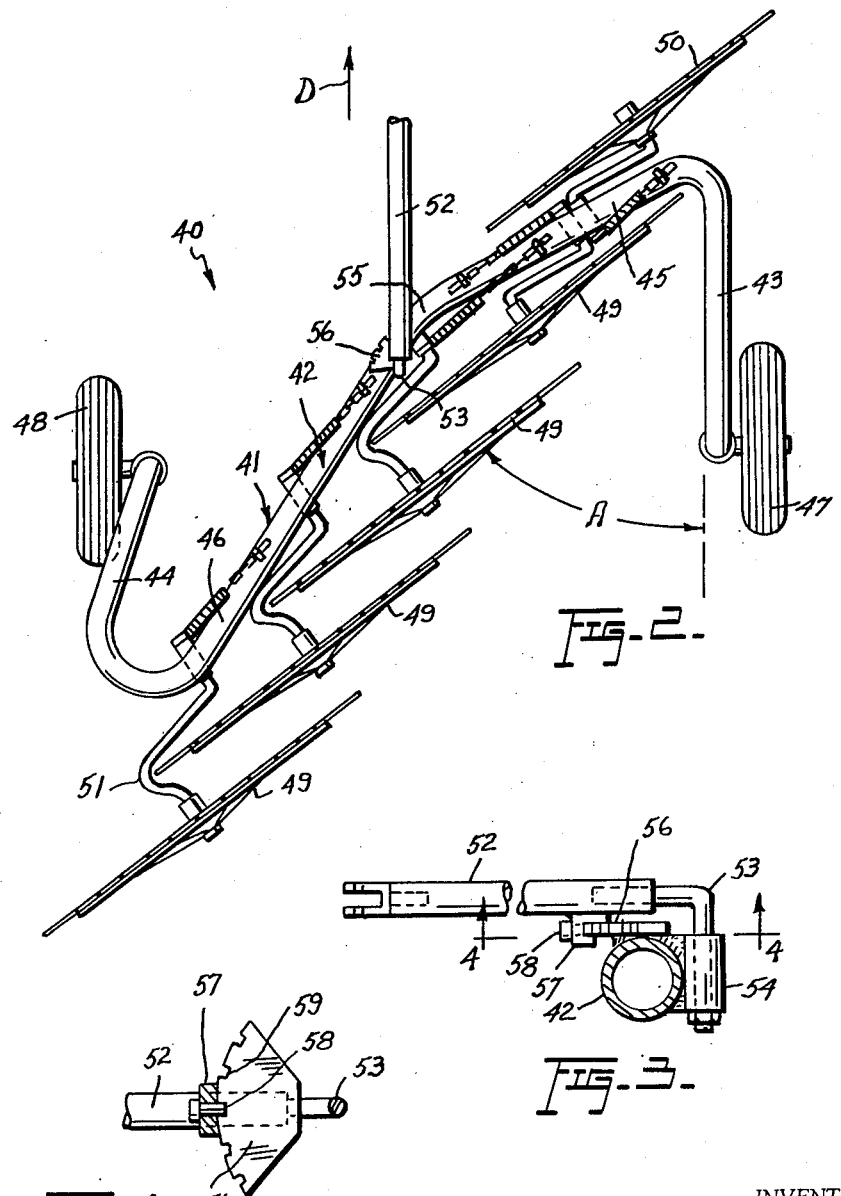

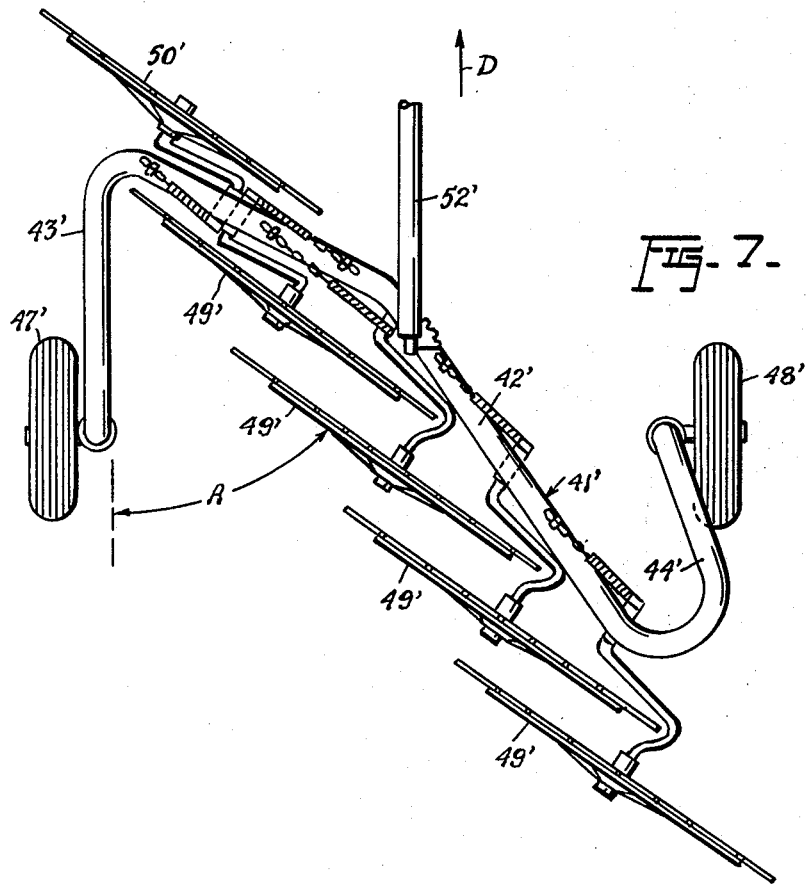

United States Patent Office 3,167,900
Patented Feb. 2, 1965

3,167,900
ROTARY SIDE DELIVERY RAKES
George C. Wood, Edenton, N.C.
Original application Oct. 5, 1960, Ser. No. 60,667.
Divided and this application Nov. 20, 1961, Ser. No. 160,385
5 Claims. (Cl. 56—377)

This invention relates to new and useful improvements in rotary side delivery rakes, and in particular the invention concerns itself with improvements in rakes of the type disclosed in United States Patents No. 2,447,354, dated August 17, 1948, No. 2,472,260, dated June 7, 1849, and No. 2,844,935, dated July 29, 1958.

The present application is a division of my application Serial No. 60,667, filed October 5, 1960.

The principal object of the invention is to substantially simplify the frame structure of such rakes, thus rendering the same more easy and economical to manufacture, lighter in weight and less cumbersome to operate.

Another important object of the invention is to provide an improved frame structure for such rakes, which frame structure is so arranged that some of the raking wheels may operate rearwardly of or behind the frame structure and therefore be pulled thereby, while one of the raking wheels operates forwardly of the frame structure and is pushed thereby, the combined pulling and pushing effect of the various raking wheels resulting in a more efficient raking operation.

Another important object of the invention involves the provision of means on the frame structure for selectively maintaining the raking wheels off the ground while the rake is being transported.

With the above more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of one embodiment of the rake in accordance with the invention;

FIGURE 2 is a top plan view of another embodiment thereof;

FIGURE 3 is a fragmentary sectional detail on an enlarged scale, showing the connection of the hitching bar to the frame member of the embodiment of FIGURE 2;

FIGURE 4 is a fragmentary sectional detail, taken substantially in the plane of the line 4—4 in FIGURE 3;

FIGURE 5 is a fragmentary side elevational view of the raking wheel biasing means such as may be used in either the embodiment of FIGURE 1 or of FIGURE 2, the biasing means being shown in its operative position;

FIGURE 6 is a view similar to that shown in FIGURE 5 but illustrating the biasing means as used for maintaining the raking wheel off the ground; and FIGURE 7 is a view similar to FIGURE 2 but showing the frame member transposed from the position shown in FIGURE 2.

Referring now to the accompanying drawings in detail, particularly to FIGURE 1, the rotary side delivery rake in accordance with the invention is designated generally by the numeral 10 and embodies in its construction an elongated frame member 11 having a main portion 12 disposed obliquely to the direction of travel D of the rake, and an end portion 13 which is substantially parallel to the direction of travel. The main portion 12 is angulated intermediate its ends as at 14 so as to provide a relatively short front region 15 and a relatively long back region 16, the back region having a smaller degree of angularity to the direction of travel than the front region, as will be apparent.

The end portion 13 is integral with the front end of the front region 15 and extends rearwardly therefrom, its rear end being downturned and provided with a travelling wheel 17. A second frame member 18, which is straight in plan view, is secured at one end thereof by welding, or the like, to the main portion 12 of the frame member 11 and projects laterally outwardly as shown, its outer end being downturned and provided with a second travelling wheel 19 which is substantially transversely aligned with the wheel 17. The frame member 18 is connected to the member 11 at a point adjacent the angulation 14. A suitable hitching bar 20 is attached to the main portion 12 of the frame member 11 adjacent the member 18, this being effected by a pivot connection 21 between the bar and a bracket 22 secured to the frame member, so that the bar 20 may be angularly adjusted in a horizontal plane to correspondingly adjust the lateral spacing or offset of the rake from the tractor by which it is drawn. The bar 20 carries a clamp 23 which engages a curved bar or segment 24 secured to the rake frame, whereby the bar 20 may be locked in a predetermined, angularly adjusted position.

A plurality of rotatable raking wheels 25 are mounted for raising and lowering movement on the back region 16 of the main portion 12 of the frame member 11 and are disposed rearwardly thereof so that they are pulled when the rake is drawn in the direction D. The structure and mounting of these wheels is substantially the same as disclosed in the aforementioned Patent No. 2,844,935, it being understood that each raking wheel is supported by a crank arm 26 journalled in a bearing 27 on the rake frame. The crank arm 26 is provided with an upstanding strap 28 to which is connected one end of a tension spring 29 having its other end connected to a length of chain 30, best shown in FIGURE 5. The links of the chain are selectively engageable with a notched keeper plate 31 secured to the frame, whereby the tension of the spring 19 may be adjusted so as to bias the crank arm upwardly with sufficient force to substantially counter-balance the weight of the associated raking wheel. When the rake is being transported, the chain 30 may be engaged with the keeper plate 31 as well as in a notch 32 formed in the strap 28 as shown in FIGURE 6, so that a fixed, predetermined length of the chain extends between the strap and the keeper plate to sustain the associated raking wheel off the ground.

An additional raking wheel 33 is provided, being mounted on and disposed forwardly of the front region 15 of the main portion 12 of the frame member 11, whereby the wheel 33 is pushed rather than pulled when the rake is in operation. The mounting of the wheel 33 is substantially the same as that of the wheels 25, and the combined pulling and pushing effect of the several wheels results in a more efficient raking operation.

It is to be noted that the several raking wheels 25, 33 operate in spaced parallel planes which are offset by the angle A from the direction of travel D, the magnitude of the angle A amounting to approximately 52°. The arrangement of the frame member 11 is such that the front region 15 is disposed between the wheel 33 and the next adjacent of the wheels 25 and the frame arrangement permits relatively smaller raking wheels with a smaller number of raking teeth thereon to be employed with the same operational overlap of the wheels as exists, for example, in the aforementioned Patent No. 2,844,935. Moreover, as compared to the frame structure in that patent, the present invention utilizes a simple weld of the frame member 18 to the member 11 and dispenses with the two angulated frame members and associated gusset structure of that patent.

The modified embodiment of the invention shown in FIGURES 2–4 and designated generally by the reference numeral 40 utilizes a substantially S-shaped frame member 41 having a main or intermediate portion 42 obliquely inclined with reference to the direction of travel D and a pair of integral end portions 43, 44. The intermediate portion 42 includes a front region 45 and a back region 46, the arrangement of which is similar to that already explained in connection with the embodiment of FIGURE 1. The end portion 43 extends rearwardly from the front end of the front region 45 and carries a travelling wheel 47 at its rear end, while the end portion 44 extends forwardly from the rear end of the back region 46 and carries a travelling wheel 48 at its front end, the wheels 47, 48 being substantially transversely aligned.

The raking wheels 49 are mounted in substantially the same manner as already described on the front and rear or back regions of the intermediate portion 42 and rearwardly thereof so as to be subjected to a pull, while an additional raking wheel 50 is mounted on and forwardly of the front region 45 so as to be subjected to a push. The arrangement of the wheels relative to the frame in this embodiment is such that some of the crank arms supporting the raking wheels are curved or offset as exemplified at 51, in order to provide clearance for the adjacent raking wheels, as will be clearly apparent. Also, the counter-balancing straps in FIGURE 2, corresponding to the straps 28 in the embodiment of FIGURES 1, 5 and 6, are secured to the end portions of the cranks 26 which are journalled in the bearings 27, rather than to intermediate portions of the cranks, as will be noted in FIGURE 2.

The hitching bar 52 in this embodiment is equipped with an angulated rod portion 53 at its inner end, which rod portion is rotatably journalled in a vertical sleeve or bearing 54 secured to one side of the frame portion 42 adjacent the bend or angulation 55 between the regions 45 and 46. The frame portion 42 also has secured thereto a sector plate 56, an edge portion of which is slidably engaged by a guide 57 secured to the underside of the bar 52. The guide 57 is provided with a removable keeper pin 58 which is selectively received in notches 59 of the sector plate, whereby to retain the bar 52 in a preadjusted position relative to the frame of the rake.

As in the embodiment of FIGURE 1, the ends of the frame portions 43, 44 of the embodiment of FIGURE 2 are downturned to carry the respective wheels 47, 48.

While the frame member 41 as shown in FIGURE 2 has been referred to as being substantially S-shaped, its arangement may be transposed so that it is substantially Z-shaped or reversed S-shaped, as illustrated by the frame member 41' in FIGURE 7. In such a transposed arrangement the intermediate portion 42' extends obliquely from left to right rather than from right to left, with the end portion 44' projecting forwardly and the end portion 43' projecting rearwardly from the ends of the intermediate portion 42'. However, the arrangement of the raking wheels in FIGURE 7 is the same as in FIGURE 2, in that the wheels 49' are disposed rearwardly and the wheel 50' forwardly of the frame portion 42'. The travelling wheels 47', 48' and the hitching bar 52' are provided in the embodiment of FIGURE 7 as in that of FIGURE 2.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, such as may lie within the spirit and scope of the invention as claimed.

What is claimed as new is:

1. A side delivery hay rake comprising a plurality of rotatable raking wheels having their planes of rotation angularly related to the normal line of forward motion of said rake, each of said raking wheels positioned rearwardly and laterally of its next forwardly adjacent raking wheel to form a hay conveying echelon, a draft member connected to an elongated frame member made mobile by rotary ground engaging supports, said supports being spaced laterally at either end of said elongated frame member so as to assist in maintaining said frame in a generally constant attitude relative to the ground traversed and to support and maintain said raking wheels in said echelon, axles connecting said wheels, for support, to said frame so as to permit said raking wheels to rise and fall responsively to the underlying terrain, said axles extending from said frame so as to position the axis of rotation for said raking wheels generally parallel to each other, said elongated frame member including an intermediate portion disposed obliquely to the direction of travel of the rake, and reversely directed end portions one of which extends rearwardly from the front end of the oblique portion on one side thereof and the other of which extends from the rear end of the oblique frame portion on the oppposite side thereof, said rotary ground engaging supports being carried by the respective reversely directed end portions and being substantially aligned.

2. A side delivery hay rake comprising a plurality of rotatable raking wheels having their planes of rotation angularly related to the normal line of forward motion of said rake, each of said raking wheels being positioned rearwardly and laterally of its next forwardly adjacent wheel to form a hay conveying echelon, a draft member bearing frame extending between an adjacent pair of said raking wheels in said echelon, said frame having a pair of ground engaging supports, said supports being spaced laterally so as to assist in maintaining said frame in a generally constant attitude relative to the ground traversed and to support and maintain said raking wheels in said echelon, axles connecting said raking wheels for support to said frame so as to permit said wheels to rise and fall responsively to the underlying terrain, some of said axles extending from said frame rearwardly and at least one axle being mounted forwardly of said frame so as to position the axis of rotation of said raking wheels generally parallel to each other, the wheel supporting axles all being connected to a common frame member, said frame member being of a substantially S shaped configuration and including an intermediate portion diagonally inclined with reference to the direction of travel, and reversely directed end portions extending toward one another on opposite sides of the diagonally inclined end portion, said rotary ground engaging supports being carried respectively by said end portions and being substantially aligned.

3. A side delivery hay rake comprising a plurality of rotatable raking wheels having their planes of rotation angularly related to the normal line of forward motion of said rake, each of said raking wheels positioned rearwardly and laterally of its next forwardly adjacent raking wheel to form a hay conveying echelon, a draft member bearing elongated frame member of a substantially Z-shaped configuration made mobile by ground engaging supports, said supports being spaced laterally at either end of said elongated frame member so as to assist in maintaining said frame in a generally constant attitude relative to the ground traversed and to support and maintain said wheels in said echelon, axles connecting said raking wheels, for support, to said frame so as to permit said raking wheels to rise and fall responsively to the underlying terrain, said axles extending from said frame so as to position the axis of rotation for said raking wheels generally parallel to each other, said Z-shaped frame member including a main portion diagonally inclined with reference to the direction of travel, on which main portions all the raking wheels are mounted, and reversely directed end portions, one extending rearwardly from the front end of said main portion and the other extending forwardly from the rear end of said main portion on the opposite side thereof, and a pair of said ground engaging supports being mounted one on one of said reversely directed end portions of said frame, and the other of said supports being mounted on the other of said reversely directed end portions, in substantially transverse alignment with the first of said pair of supports.

4. In a rotary side delivery rake, the combination of an elongated frame member of a substantially S-shaped configuration having an intermediate portion disposed obliquely to the direction of travel of the rake and reversely directed first and second end portions, said intermediate portion being angulated intermediate its ends whereby to provide a relatively short front region and a relatively long back region having a smaller degree of angularity to the direction of travel than the front region, said first end portion of the frame member being integral with the front end of said front region of the intermediate portion and extending rearwardly therefrom, and said second end portion being integral with the rear end of said back region and extending forwardly therefrom, travelling wheels provided at the rear and front ends of the respective first and second end portions of the frame member and disposed substantially in transverse alignment, an angularly adjustable hitching bar connected to said intermediate portion of the frame member adjacent the angulation therein, a plurality of rotatable raking wheels mounted for raising and lowering movement on said front and back regions of the intermediate portion of the frame member and rearwardly of the same, and an additional rotatable raking wheel mounted for raising and lowering movement on the front region of said intermediate portion forwardly of the same.

5. In a rotary side delivery rake, the combination of an S-shaped frame member, including an intermediate portion disposed obliquely to the direction of travel of the rake, and reversely directed to traveling wheel carrying end portions projecting toward one another from opposite ends of the intermediate portion and on opposite sides of the intermediate portion a crank arm swingably attached to said frame member for raising and lowering movement and providing an axle for a rotatable raking wheel, a raking wheel carried by said crank arm an upstanding strap secured to said crank arm and provided with a notch, a notched keeper plate secured to said frame member at a point spaced from said crank arm, a tension spring connected at one end thereof to said strap, and a length of chain connected at one end thereof to the other end of said spring, the links of said chain being engageable with said notched keeper plate whereby to adjustably tension said spring and bias said crank arm upwardly and being also engageable in the notch of said strap whereby to sustain the crank arm in its raised position by a predetermined fixed length of the chain extending between the strap and said keeper plate.

References Cited in the file of this patent

UNITED STATES PATENTS

| | | |
|---|---|---|
| 2,844,935 | Cooley | July 29, 1958 |
| 3,006,133 | Van der Lely et al. | Oct. 31, 1961 |